L. A. YOUNG.
SPRING SEAT STRUCTURE.
APPLICATION FILED JUNE 17, 1909.

970,775. Patented Sept. 20, 1910.
2 SHEETS—SHEET 1.

Witnesses
O. B. Buenzger,
J. G. Howlett.

Inventor
Leonard A. Young
By T. A. Wheeler &c.
Attorneys

L. A. YOUNG.
SPRING SEAT STRUCTURE.
APPLICATION FILED JUNE 17, 1909.
970,775.
Patented Sept. 20, 1910.
2 SHEETS—SHEET 2.
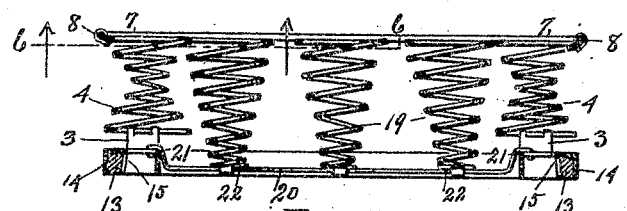
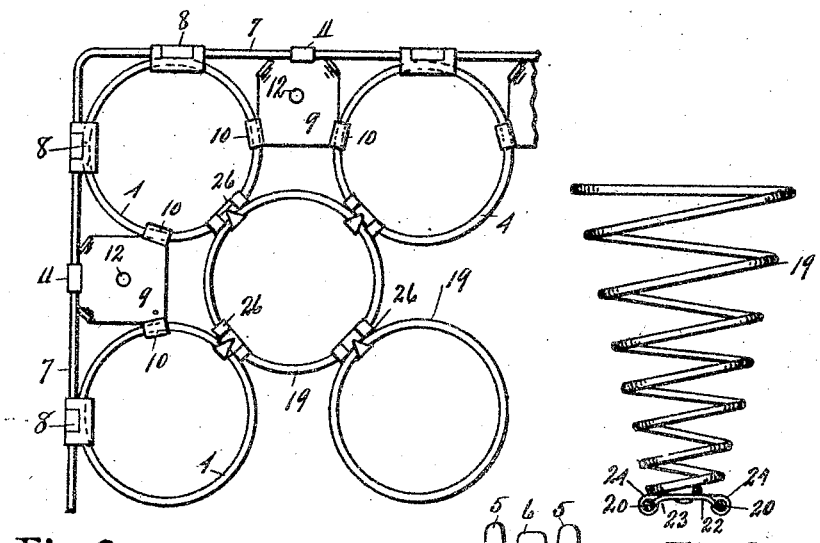
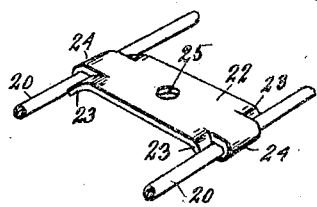
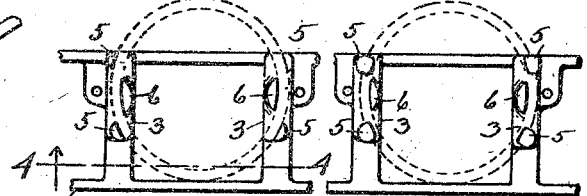
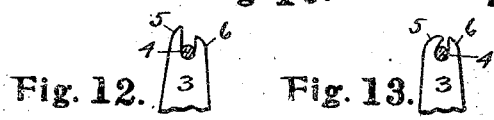
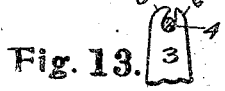
Witnesses
O. B. Baenziger
J. G. Howlett
Inventor
Leonard A. Young
By T. B. Wheeler &Co.
Attorneys

UNITED STATES PATENT OFFICE.

LEONARD A. YOUNG, OF DETROIT, MICHIGAN.

SPRING-SEAT STRUCTURE.

970,775.　　　　　Specification of Letters Patent.　Patented Sept. 20, 1910.

Application filed June 17, 1909. Serial No. 502,757.

*To all whom it may concern:*

Be it known that I, LEONARD A. YOUNG, a citizen of the United States, residing at Detroit, in the county of Wayne, State of Michigan, have invented certain new and useful Improvements in Spring-Seat Structures; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a seat base construction for spring cushion seats, especially designed for railway coaches, and consists in the construction and arrangement of parts hereinafter more fully pointed out and claimed.

The primary object of the invention is to provide a seat base construction wherein the arrangement is such as to obviate the noise incident to seat constructions as commonly made, caused by contact of the coils of the springs, when collapsed, with the spring supporting portion of the base.

A further object is to provide for mounting in the base marginal strips of wood to afford means for attaching the upholstery and to protect said strips from fire.

A further object is to provide a durable, strong, and compact base construction for spring cushion seats possessing advantageous mechanical arrangements, as will be more fully pointed out in the claims.

The above objects are attained by the structure illustrated in the accompanying drawings, in which:—

Figure 1:
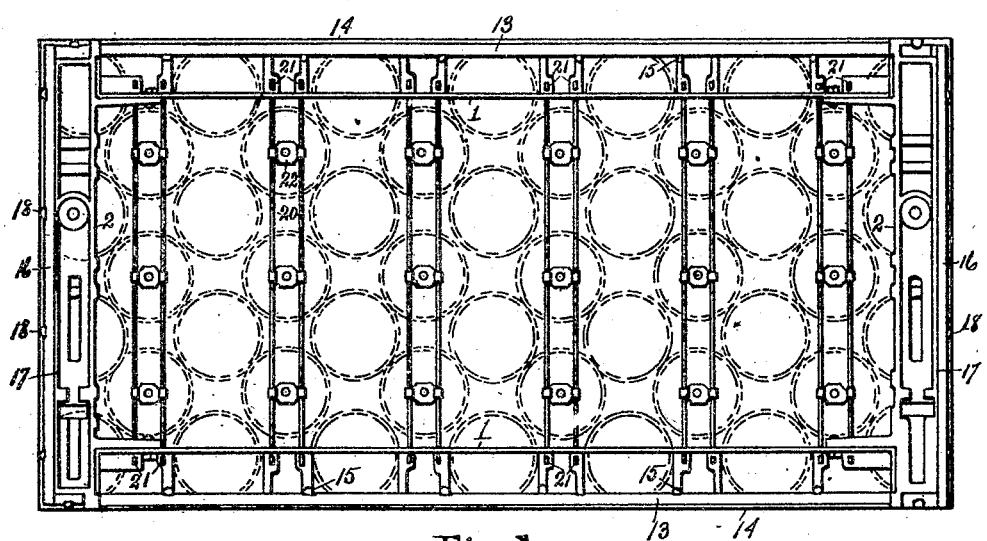
Figure 2:
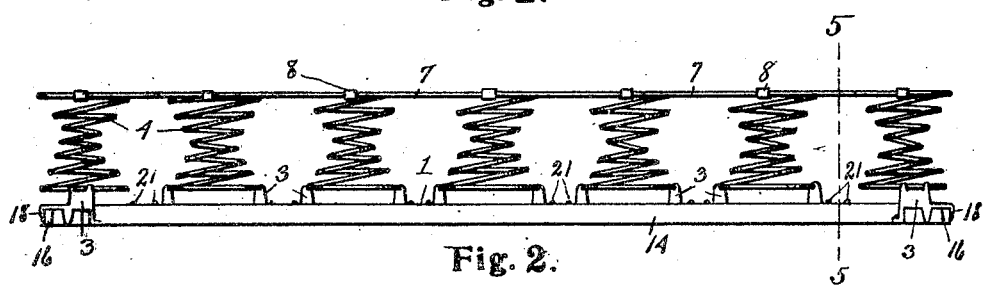
Figures 3, 4:
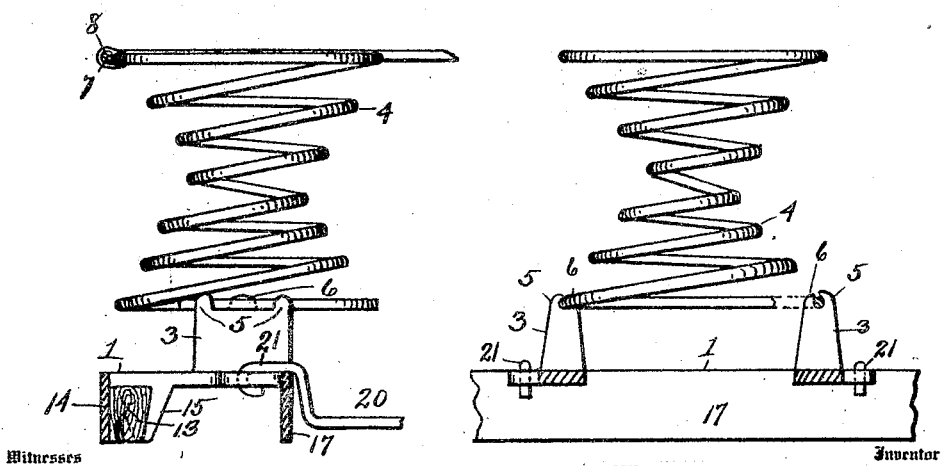

Figure 1 is an inverted plan view of a seat base construction involving my invention. Fig. 2 is a front elevation. Fig. 3 is an enlarged cross section through one of the margins of the base. Fig. 4 is an enlarged sectional view at right angles to Fig. 3, or as taken on line 4—4 of Fig. 10. Fig. 5 is a cross section through the structure as on line 5—5 of Fig. 2. Fig. 6 is a fragmentary view in section on line 6—6 of Fig. 5. Fig. 7 is a cross section through one of the bars of the frame. Fig. 8 is a detail in section through two of the stress bars of the base, showing a clip connecting said bars and a spring mounted thereon. Fig. 9 is a fragmentary view in perspective of two of said bars coupled by a clip plate. Fig. 10 is a fragmentary view in top plan of a portion of the base construction, showing the clamping prongs on the ends of the posts projecting from said base between which the coil of the spring is confined. Fig. 11 is a similar view showing the end portions of the prongs bent over as when clamping the coil of the spring. Fig. 12 is a fragmentary view in elevation of one of said posts, showing the coil of a spring lying between the prongs thereof. Fig. 13 is a similar view showing the end of one of the prongs bent over to confine the spring.

The marginal portion of the base of the seat frame comprises side bars 1 and end bars 2 which are cast of iron and annealed and suitably joined at their ends to form a rectangular frame. These marginal bars at intervals are provided with short upwardly extending posts 3 arranged in pairs and the posts of each pair separated a distance equal to the diameter of the bottom coil of the border springs 4. Each post at the top thereof is provided with upwardly projecting fingers 5 located at the opposite margins of the post on one side thereof, and with a central finger 6 located on the opposite side of the post from the fingers 5 and midway between them. The fingers 5 are disposed in a curved plane concentric with the circle described by the bottom coil of the springs, and the border springs are mounted upon the posts 3 by placing the bottom coils thereof between the fingers 5 and 6 of each pair of posts, as shown. The fingers 5 are longer than the fingers 6 and tapered, as shown in Fig. 12. To secure the springs upon the posts 3 after inserting the bottom coils thereof between said fingers, the tapered ends of the fingers 5 are bent inwardly onto the bottom coil of the springs, as shown in Fig. 13, thereby firmly locking the springs to said posts. The upper ends of the border springs 4 are connected to the top border wire 7 by suitable clips 8 which embrace said wire and the top coil of said springs. The tops of the border springs are connected together by means of the interposed plates 9, shown more clearly in Fig. 6, which are provided on their inner corners with clips 10 that embrace the top coils of said springs, each of said plates having at its outer edge a clip 11 which embraces the border wire 7. These plates 9 not only serve to tie the tops of the border springs together, but also afford means for attaching the upholstery over the tops of the springs through the apertures 12 in said plates in a manner which need not be explained, as it forms no part of this invention. To enable the upholstery to be drawn down and secured at the under side of the base, the side bars 1 are provided with marginal strips of wood 13 which lie behind the marginal flanges 14 of said bars, said strips being confined in place by the fingers 15, shown more clearly in Fig. 3, which at their outer ends are bent inwardly against said strips. For a like purpose the end bars 2 of the base are provided with marginal strips of wood 16 which lie against the longitudinal flanges 17 of the end bars and are confined thereagainst by the depending fingers 18 at the outer margin of said bars whose ends are bent inwardly against said strips to hold them in place, as clearly shown in Fig. 7. These marginal wooden strips 13 and 16 afford means for tacking the upholstery to the under side of the base, notwithstanding said base is made of iron, and when the upholstery is in place, said wooden strips are completely covered and protected.

The springs 19 of the seat intermediate the border springs are supported by the transverse rods 20 whose ends are provided with a hook 21 adapted to engage in apertures in the side bars, whereby said rods are supported in place, as shown in Fig. 3. Said rods 20 cross the frame in pairs and are tied together at intervals by means of the clip plates 22 which are provided at their ends with the marginal prongs 23 that engage the inner sides of said rods and with the central prongs 24 which pass around the rods and hold them against said prongs, thereby coupling the rods together, as clearly shown in Fig. 9. In the center of the plates 22 is an aperture 25 for attaching the lower ends of the springs 19, as shown in Fig. 8. The upper ends of the springs 19 are connected to one another and to the border springs by suitable clips 26. The supporting rods 20 are dropped below the plane of the side bars of the frame, whereby a greater depth of spring is afforded in the center of the seat.

By reason of the fact that the border springs are mounted upon the posts 3 of the marginal base bars of the frame, said springs are held above said bars in such manner as to prevent the coils thereof coming in contact with the bars when said coils are depressed by a weight upon the cushion, obviating the liability of any clicking sound by reason of the occasional engagement of the coils of the spring with the marginal bars of the base, as occurs in seat constructions in common use.

Having thus fully set forth my invention, what I claim as new and desire to secure by Letters Patent, is:—

1. A base construction for spring seats comprising marginal bars having relatively small oppositely disposed posts extending above the plane thereof, border springs mounted upon the upper ends of said posts which engage opposite marginal portions of the bottom coils thereof, and means for fastening said coils to said posts.

2. A spring seat structure comprising a lower frame, an upper border wire, border springs connected at their upper ends to said border wire, and means engaging marginal portions only of the lower coils of said springs for supporting the lower ends thereof above the plane of the base frame and free from contact therewith.

3. In a spring seat structure, a base frame, an upper border wire, centrally disposed springs supported on the base frame, border springs attached at their upper ends to the border wire, and means upon the marginal portions only of the base frame engaging sectoral portions only of the bottom coils of said springs for supporting the lower ends of the border springs above the plane of said base and free from contact therewith.

4. A base construction for spring seats, comprising a frame having marginal bars, side bars having posts rising vertically therefrom arranged in pairs, fingers upon the upper ends of said posts, and border springs mounted upon said posts and engaged by said fingers to retain them thereon.

5. A base construction for spring seats, comprising marginal bars, posts projecting vertically from said bars, border springs each mounted upon the tops of a plurality of said posts which engage the bottom coils of said springs at points only in the circumference thereof, and means for securing the springs to the upper ends of said posts to retain them in place.

6. A base construction for spring seats, comprising marginal bars having depending marginal flanges, a filling strip of wood or analogous material lying against said flange, and a plurality of supporting fingers depending from said marginal bars and engaging said filling strip, said fingers being bent laterally to securely hold said strip against said flanges.

7. A spring seat structure comprising marginal base bars, border springs mounted thereon, cross rods in pairs extending between the base bars, clip plates connecting said cross rods in pairs, centrally disposed springs mounted upon and secured to said plates, a top border wire to which the border springs are connected, vertical posts projecting in pairs from said marginal bars, the base of each of the border springs being supported upon a pair of said posts above the plane of the base of the centrally disposed springs.

In testimony whereof, I sign this specification in the presence of two witnesses.

LEONARD A. YOUNG.

Witnesses:
E. S. WHEELER,
I. G. HOWLETT.